US012687756B2

(12) United States Patent
Hashiba et al.

(10) Patent No.: US 12,687,756 B2
(45) Date of Patent: Jul. 21, 2026

(54) ELECTROCHROMIC DEVICE

(71) Applicant: Japan Display Inc., Tokyo (JP)

(72) Inventors: Yoshikazu Hashiba, Tokyo (JP); Keita Sasanuma, Tokyo (JP)

(73) Assignee: Japan Display Inc., Tokyo (JP)

( * ) Notice: Subject to any disclaimer, the term of this patent is extended or adjusted under 35 U.S.C. 154(b) by 276 days.

(21) Appl. No.: 18/648,890

(22) Filed: Apr. 29, 2024

(65) Prior Publication Data

US 2024/0369894 A1 Nov. 7, 2024

(30) Foreign Application Priority Data

May 1, 2023 (JP) ................................. 2023-075697

(51) Int. Cl.
G02F 1/163 (2006.01)

(52) U.S. Cl.
CPC .................................... G02F 1/163 (2013.01)

(58) Field of Classification Search
CPC . G02F 1/163; G02F 1/155; G02F 1/15; G02F 1/1514; G02F 1/1533; G02F 1/161
See application file for complete search history.

(56) References Cited

U.S. PATENT DOCUMENTS

| | | | | |
|---|---|---|---|---|
| 11,732,527 B2 * | 8/2023 | Rozbicki | ................... | E06B 3/67 |
| | | | | 428/34 |
| 12,361,903 B2 * | 7/2025 | Sasanuma | ................ | G09G 3/38 |

| | | | | |
|---|---|---|---|---|
| 12,372,846 B2 * | 7/2025 | Zedlitz | ................. | G05B 19/048 |
| 12,560,846 B2 * | 2/2026 | Friedman | ................ | G02F 1/155 |
| 2005/0273218 A1 * | 12/2005 | Breed | ................ | G06K 7/10178 |
| | | | | 701/2 |
| 2007/0097484 A1 * | 5/2007 | Libretto | ................. | G02F 1/163 |
| | | | | 359/275 |
| 2010/0164914 A1 | 7/2010 | Cassidy | | |

FOREIGN PATENT DOCUMENTS

JP          2010-518456 A          5/2010

* cited by examiner

*Primary Examiner* — Andrew Sasinowski

(74) *Attorney, Agent, or Firm* — K&L Gates LLP

(57) ABSTRACT

According to an aspect, an electrochromic device, includes: two electrodes facing each other in a first direction with an electrochromic material therebetween; an operational amplifier circuit an output of which is coupled to one of the two electrodes; a first wiring line coupled to a positive power supply coupling part of the operational amplifier circuit; a second wiring line provided as a transmission line for the output; a first contact coupling the first wiring line to a light-transmissive conductor layer configured to transmit a positive power supply potential of the operational amplifier circuit; and a second contact coupling the second wiring line to the one electrode. A distance between the first contact and the second contact in a second direction is larger than a distance between a part of the first wiring line and a part of the second wiring line that are aligned in parallel in the second direction.

5 Claims, 10 Drawing Sheets

ELECTROCHROMIC DEVICE

CROSS-REFERENCE TO RELATED APPLICATION

This application claims the benefit of priority from Japanese Patent Application No. 2023-075697 filed on May 1, 2023, the entire contents of which are incorporated herein by reference.

BACKGROUND

1. Technical Field

What is disclosed herein relates to an electrochromic device.

2. Description of the Related Art

As described in Japanese Patent Publication No. 2010-518456, there has been known an electrochromic device capable of forming an area in which the degree of light transmission and the degree of coloration can be controlled in accordance with an applied voltage.

When an operational amplifier circuit is used to amplify the voltage that is applied to an electrochromic material, depending on a positional relationship of a contact between an electrode used to give an application voltage to the electrochromic material and the output of the operational amplifier circuit with a contact included in a transmission line to couple a positive power supply to the operational amplifier circuit, electrochemical corrosion may possibly occur between the contacts.

For the foregoing reasons, there is a need for an electrochromic device that can reduce electrochemical corrosion between the contacts.

SUMMARY

According to an aspect, an electrochromic device, includes: two electrodes facing each other in a first direction with an electrochromic material interposed therebetween; an operational amplifier circuit an output of which is coupled to one of the two electrodes; a first wiring line coupled to a positive power supply coupling part of the operational amplifier circuit; a second wiring line provided as a transmission line for the output; a first contact coupling the first wiring line to a light-transmissive conductor layer that is stacked in the first direction on a first conductor layer with an insulating layer interposed therebetween and is configured to transmit a positive power supply potential of the operational amplifier circuit, the first conductor layer forming the first wiring line; and a second contact coupling the second wiring line to the one electrode that is stacked in the first direction on a second conductor layer with an insulating layer interposed therebetween, the second conductor layer forming the second wiring line. A distance between the first contact and the second contact in a second direction is larger than a distance between a part of the first wiring line and a part of the second wiring line that are aligned in parallel in the second direction.

DETAILED DESCRIPTION

Figure 1:
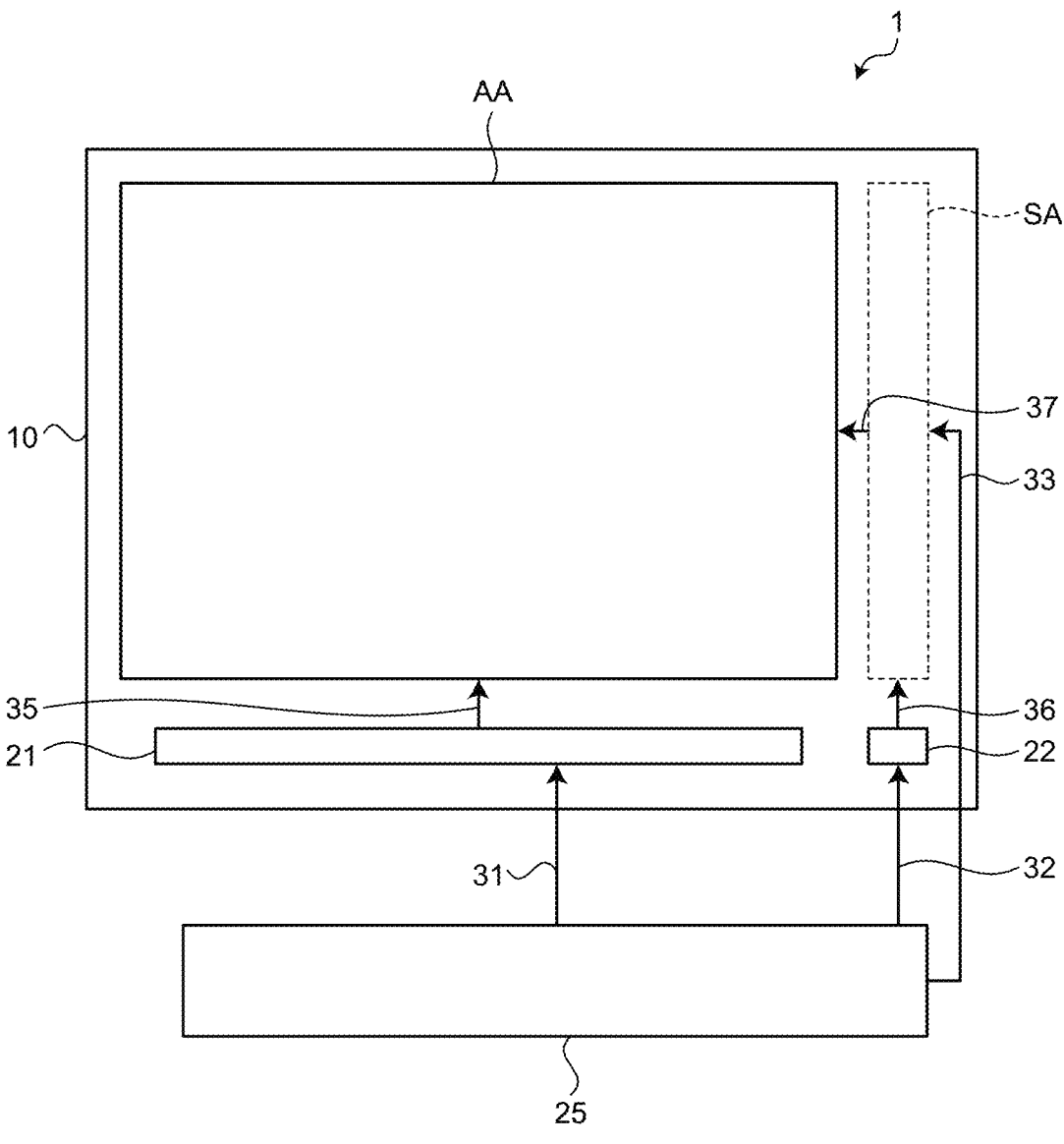
FIG. 1 is a schematic diagram illustrating a main configuration of a device.

Hereinafter, embodiments according to the present disclosure will be described with reference to the drawings. What is disclosed herein is merely an example, and the present disclosure naturally encompasses appropriate modifications that are easily conceivable by those skilled in the art while maintaining the gist of the invention. For the purpose of further clarifying the description, the drawings sometimes schematically illustrate, the widths, thicknesses, shapes, and the likes of constituents as compared with actual aspects, but they are merely examples, and interpretation of the present disclosure is not limited thereto. In the present specification and the drawings, the same constituents as those illustrated in a drawing having already been discussed are given the same reference numerals and detailed description thereof will be sometimes appropriately omitted.

First Embodiment

FIG. 1 is a schematic diagram illustrating a main configuration of a device 1. The device 1 is an electrochromic device. Hereinafter, unless otherwise noted, the term EC denotes ElectroChromic. The EC device is a device that utilizes an EC material 15 (see FIG. 3) capable of reversibly controlling the degree of light transmission and the degree of coloration by the control of a voltage that is applied thereto. Examples of the EC material 15 include ion-implanted metal oxides such as tungsten oxide ($WO_3$), but the EC material 15 is not limited to them, and other materials that cause the same phenomenon as the above-described materials may be employed as the EC material 15.

As illustrated in FIG. 1, the device 1 includes an EC panel 10 in which an active area AA is formed. The EC material 15 described above is sealed in the active area AA. Therefore, the degree of light transmission and the degree of coloration in the active area AA can be controlled by the control of the voltage that is applied to the EC material 15.

Various signals related to the control of the voltage that is applied to the EC material 15 are given to the EC panel 10 from a host 25. The signals are given through different lines in accordance with roles of the signals. In an example illustrated in FIG. 1, wirings 31, 32, 33 extend from the host 25.

A signal outputted via the wiring 31 is given as a drive signal to the active area AA via a gate driver 21 and a wiring 35. A signal outputted via the wiring 32 is given to a switching circuit area SA via a decoder 22 and a wiring 36. The potential of a signal outputted via the wiring 33 is given as a differential potential (+) of a later-mentioned operational amplifier 70 to the active area AA via the switching circuit area SA and a wiring 37.

Figure 2:
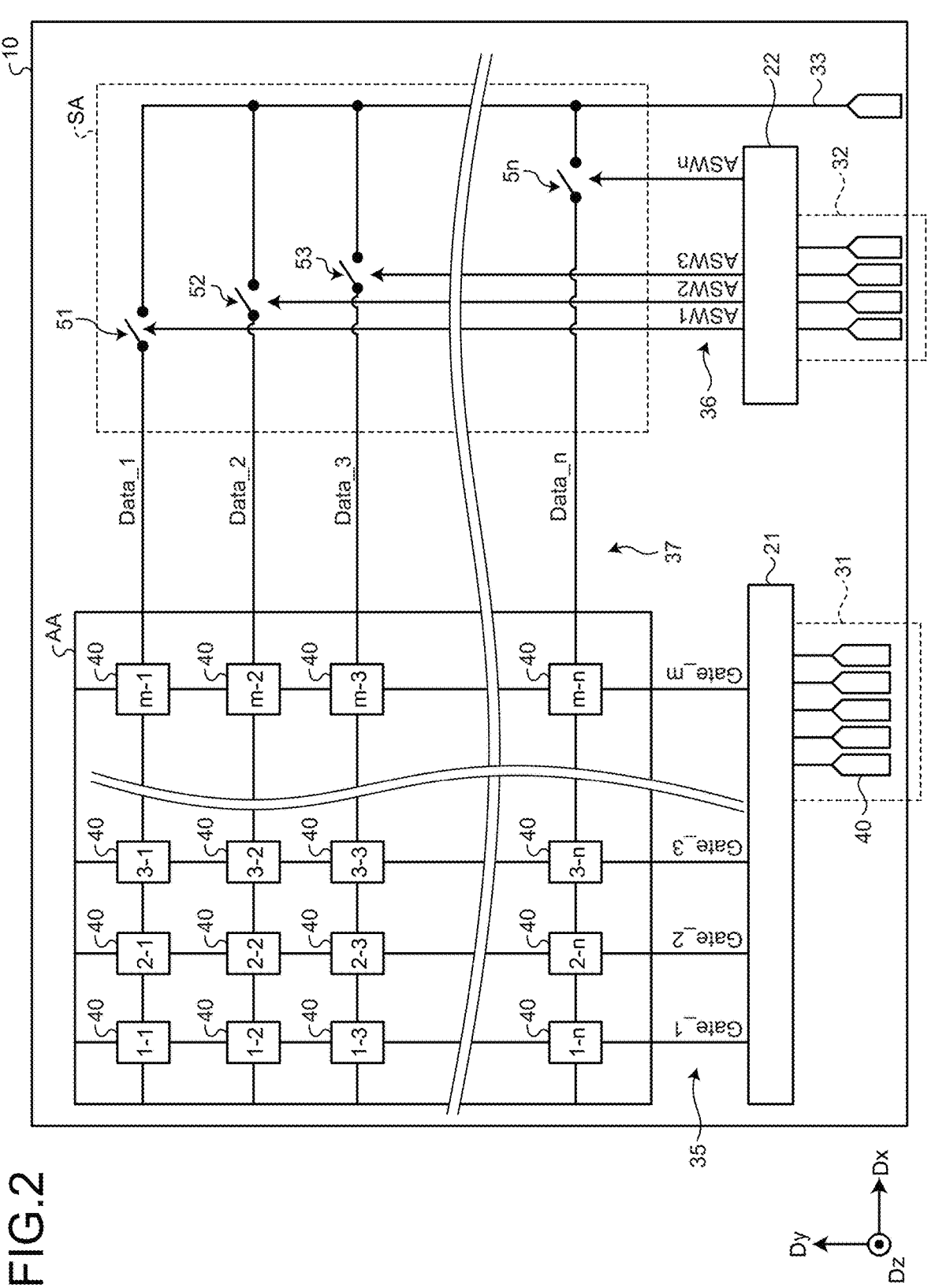
FIG. 2 is a schematic diagram illustrating a configuration example of an EC panel.

FIG. 2 is a schematic diagram illustrating a configuration example of the EC panel 10. As illustrated in FIG. 2, a plurality of segment circuits 40 is arranged in a matrix of a row-column configuration in the active area AA.

Figure 3:
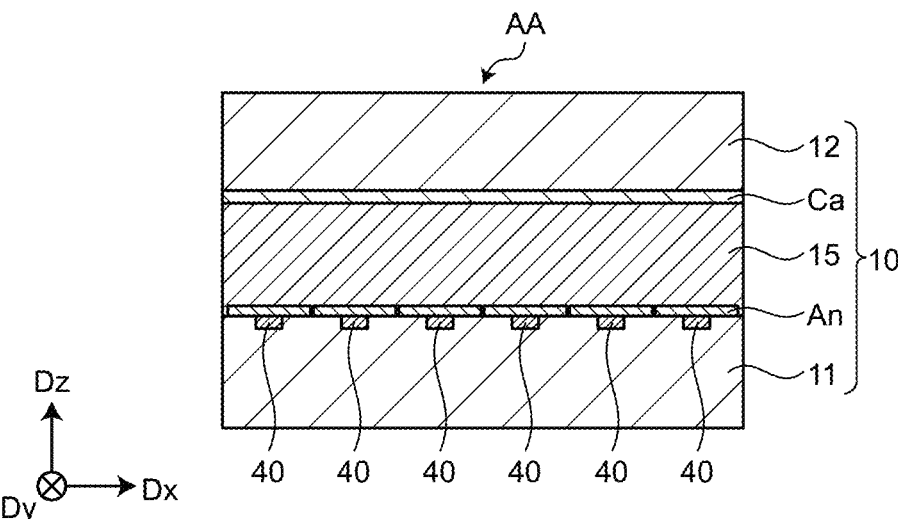
FIG. 3 is a schematic diagram illustrating a main configuration included in a multilayered structure of an active area.

FIG. 3 is a schematic diagram illustrating a main configuration included in a multilayered structure of the active area AA. As illustrated in FIG. 3, the EC panel 10 is configured such that a first substrate 11 and a second substrate 12 face each other in a first direction Dz with the EC material 15 interposed therebetween, thereby sealing the EC material 15. Hereinafter, a direction in which the first substrate 11 and the second substrate 12 face each other is referred to as the first direction Dz. One of two directions orthogonal to the first direction Dz is referred to as a second direction Dx, meanwhile the other of the two directions is referred to as a third direction Dy. The second direction Dx and the third direction Dy are orthogonal to each other.

The first substrate 11 and the second substrate 12 are each a substrate having light transmissive properties, similar to a glass substrate. Although not illustrated, a sealing material is provided so as to rim the active area AA in plan view as viewing the Dx-Dy plane from its front. The EC material 15 is sealed in the active area AA by the first substrate 11, the second substrate 12, and the sealing material.

A plurality of anode electrodes An is formed on a surface of the first substrate 11 facing the EC material 15. A cathode electrode Ca is formed on a surface of the second substrate 12 facing the EC material 15. The anode electrodes An are arranged in a matrix of a row-column configuration in a plane parallel to the Dx-Dy plane. Each of the anode electrodes An is coupled to a corresponding one of the segment circuits 40. The anode electrodes An face the cathode electrode Ca. A voltage that is applied to the EC material 15 is determined by a potential difference between the anode electrodes An and the cathode electrode Ca. In the first embodiment, a constant potential is given to the cathode electrode Ca. However, "a constant potential is given to the cathode electrode Ca" does not strictly mean that the entire cathode electrode Ca is caused to assume a completely constant potential, but merely indicates that the constant potential is externally given to the cathode electrode Ca through terminal connection or the like. In the first embodiment, on the precondition that the potential of the cathode electrode Ca is static, the voltage that is applied to the EC material 15 is controlled by controlling the potential of each anode electrode An. Although not illustrated in FIG. 3, various configurations necessary for causing the segment circuits 40 to function, such as wiring lines including scanning lines 350 and transmission lines 370 to be described later, are provided in the multilayered structure between the first substrate 11 and the anode electrodes An.

The wiring 35 includes a plurality of scanning lines such as the scanning lines Gate_1, Gate_2, Gate 3, . . . , Gate_m illustrated in FIG. 2. The gate driver 21 operates in accordance with a signal given from the host 25 via the wiring 31 and sequentially gives drive signals to the scanning lines Gate_1, Gate_2, Gate_3, . . . , Gate_m. m is a natural number equal to or greater than 2 and indicates the number of the segment circuits 40 aligned in the second direction Dx and the number of the scanning lines. The segment circuits 40 aligned in the third direction Dy share the same scanning line.

The wiring 37 includes a plurality of transmission lines, such as the transmission lines Data_1, Data_2, Data_3, . . . , Data_n illustrated in FIG. 2. The transmission lines are coupled to the wiring 33 via the switching circuit area SA. n is a natural number equal to or greater than 2 and indicates the number of the segment circuits 40 aligned in the third direction Dy and the number of the transmission lines. The segment circuits 40 aligned in the second direction Dx share the same transmission line.

The transmission lines such as the transmission lines Data_1, Data_2, Data_3, . . . , Data_n are coupled to the wiring 33 via first switches 51, 52, 53, . . . , 5n, respectively. As illustrated in FIG. 2, the transmission line Data_1 is coupled to the wiring 33 via the first switch 51. The transmission line Data_2 is coupled to the wiring 33 via the first switch 52. The transmission line Data_3 is coupled to the wiring 33 via the first switch 53. Likewise, the transmission line Data_n is coupled to the wiring 33 via the first switch 5n.

The first switches 51, 52, 53, . . . , 5n operate under the control of the decoder 22. The decoder 22 is coupled to wiring lines ASW1, ASW2, ASW3, ASWn that transmit signals for individually controlling the first switches 51, 52, 53, . . . , 5n. As illustrated in FIG. 2, the wiring line ASW1 couples the decoder 22 to the first switch 51. The wiring line ASW2 couples the decoder 22 to the first switch 52. The wiring line ASW3 couples the decoder 22 to the first switch 53. Likewise, the wiring line ASWn couples the decoder 22 to the first switch 5n. The wiring 36 includes the wiring lines ASW1, ASW2, ASW3, . . . , ASWn.

The decoder 22 operates in accordance with a signal given from the host 25 via the wiring 32 to control the operation of the first switches 51, 52, 53, . . . , 5n. More specifically, the decoder 22 functions as a so-called combinational logic circuit and is capable of controlling the operation of the first switches 51, 52, 53, . . . , 5n in accordance with the signal given via the wiring 32 including a smaller number of wiring lines than the number of the wiring lines included in the wiring 36.

Figure 4:
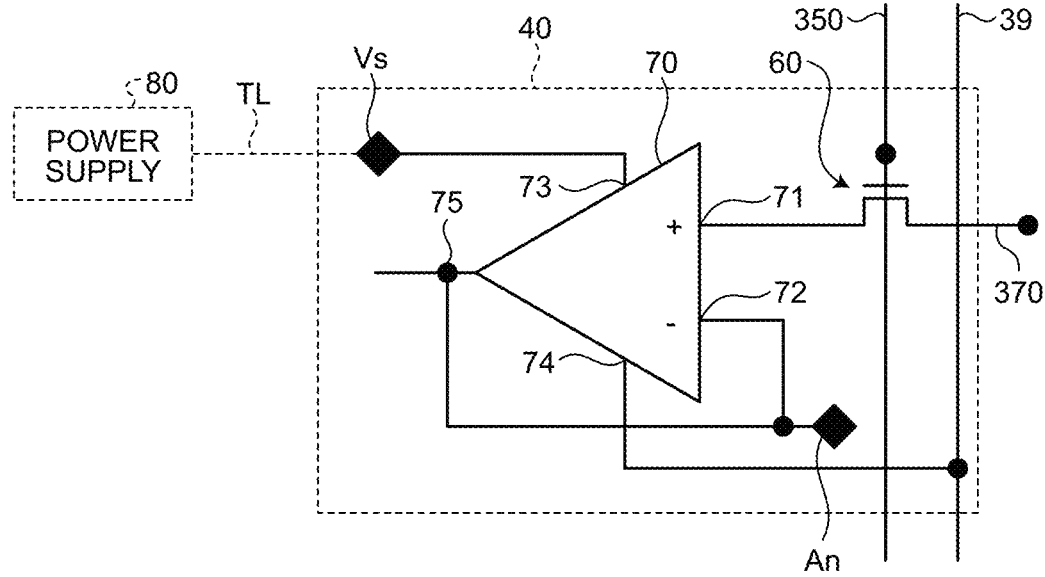
FIG. 4 is a schematic circuit diagram illustrating a configuration of a segment circuit.

FIG. 4 is a schematic circuit diagram illustrating a configuration of the segment circuit 40. A switching element 60 and the operational amplifier 70 are provided in the segment circuit 40.

The switching element 60 is a field effect transistor (FET). The gate of the switching element 60 is coupled to the scanning line 350. One of the source and the drain of the switching element 60 is coupled to the transmission line 370. The other one of the source and the drain of the switching element 60 is coupled to a non-inverting input 71 (+) of the operational amplifier 70. In other words, the switching element 60 functions as a switching element that, at the timing when a signal (a drive signal) is given to the gate via the scanning line 350, gives the operational amplifier 70 a potential corresponding to a potential caused by a signal transmitted via the transmission line 370.

The transmission line 370 illustrated in FIG. 4 is any of transmission lines Data_1, Data_2, Data_3, . . . , Data_n illustrated in FIG. 2. The scanning line 350 illustrated in FIG. 4 is any of scanning lines Gate_1, Gate_2, Gate_3, . . . Gate_m illustrated in FIG. 2.

The operational amplifier 70 illustrated in FIG. 4 is an operational amplifier circuit to which a positive power supply potential (Vsupply) is given from a positive power supply coupling part 73 via a light-transmissive electrode layer Vs and in which a negative power supply coupling part 74 is coupled to a wiring line 39. Furthermore, as described above, the non-inverting input 71 (+) of the operational amplifier 70 is coupled to the other one of the source and the drain of the switching element 60. Furthermore, an inverting input 72 (−) and an output 75 of the operational amplifier 70 are coupled to the anode electrode An. The operational amplifier 70 in such coupling form functions as a so-called non-inverting amplifier and supplies, via the output 75, the anode electrode An with a signal corresponding to a signal potential given from the non-inverting input 71 (+) via the switching element 60.

A power supply 80 coupled to the light-transmissive electrode layer Vs in FIG. 4 gives a positive power supply potential (Vsupply) to the operational amplifier 70 from the positive power supply coupling part 73 via a transmission line TL and the light-transmissive electrode layer Vs. In the first embodiment, the transmission line TL illustrated in FIG. 4 is a wiring line provided outside the active area AA (see FIG. 1). Note that the potential given from the negative power supply coupling part 74 via the wiring line 39 is a potential in accordance with a specific design of the operational amplifier 70, and may be a ground potential or may be a negative potential different in polarity from the positive power supply potential (Vsupply).

Figure 5:
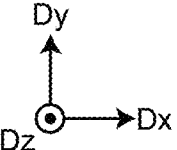
FIG. 5 is a Dx-Dy plan view illustrating an example of various types of wiring lines related to the configuration of the segment circuit, the form of coupling between a light-transmissive electrode layer and a first wiring line via a first contact, and the form of coupling between an anode electrode and a second wiring line via a second contact.

FIG. 5 is a Dx-Dy plan view illustrating an example of various types of wiring lines related to a configuration of the segment circuit 40, the form of coupling between the light-transmissive electrode layer Vs and a first wiring line E1 via a first contact 81, and the form of coupling between the anode electrodes An and a second wiring line E2 via a second contact 82.

As illustrated in FIG. 5, the segment circuit 40 includes the first wiring line E1 and the second wiring line E2 on one side of the operational amplifier 70 in the second direction Dx and includes the scanning line 350, the transmission line 370, and the wiring line 39 on the other side of the operational amplifier 70 in the second direction Dx. The longitudinal direction of each of the scanning line 350 and the wiring line 39 is along the third direction Dy. The longitudinal direction of the transmission line 370 is along the second direction Dx. The switching element 60 is disposed at a position at which the scanning line 350 and the transmission line 370 intersect with each other in plan view. A wiring line 61 extending from the switching element 60 toward the one side in the second direction Dx is coupled to the non-inverting input 71 (+) in FIG. 4. A branch line 391 extending from the wiring line 39 toward the one side in the second direction Dx is coupled to the negative power supply coupling part 74 in FIG. 4.

The first wiring line E1 includes a base 111 the longitudinal direction of which is along the third direction Dy. The first wiring line E1 includes extensions 112 bent at the ends of the base 111 and extending in the second direction Dx. Each of the extension 112 is disposed to be coupled to the operational amplifier 70 at the one side of the second direction Dx in the operational amplifier 70. The base 111 of the first wiring line E1 is coupled to the light-transmissive electrode layer Vs (see FIG. 9) via the first contact 81.

The second wiring line E2 includes an L-shaped base 120. The base 120 includes a first base 121 the longitudinal direction of which is along the third direction Dy and a second base 122 the longitudinal direction of which is along the second direction Dx, and the first base 121 and the second base 122 are formed continuously. The first base 121 is positioned between the base 111 and the operational amplifier 70. The second base 122 is disposed along the second direction Dx on one side of the operational amplifier 70 in the third direction Dy. The extension extending from one of the first base 121 and the second base 122 toward the operational amplifier 70 is coupled to the inverting input 72 (−), and the extension extending from the other one of the first base 121 and the second base 122 toward the operational amplifier 70 is coupled to the output 75. The second base 122 of the second wiring line E2 is coupled to the anode electrode An (see FIG. 9) via the second contact 82.

Here, a distance in the second direction Dx between the first contact 81 and the second contact 82 is referred to as a distance D1. A distance in the second direction Dx between the base 111 and the first base 121 is referred to as a distance D2. The distance D1 is larger than the distance D2. In particular, in the configuration illustrated in FIG. 5, the first contact 81 is disposed on one side of the operational amplifier 70 in the second direction Dx, meanwhile the second contact 82 is disposed on one side of the operational amplifier 70 in the third direction Dy and closer to the other side thereof in the second direction Dx. Thus, the distance D1 can be significantly larger than the distance D2. Thus, in the first embodiment, one of the first contact 81 and the second contact 82 (the first contact 81) is positioned on one side of the operational amplifier 70 in the second direction Dx, meanwhile the other one of the first contact 81 and the second contact 82 (the second contact 82) is not positioned on the one side of the operational amplifier 70 in the second direction Dx.

The importance of such positional relationship between the first contact 81 and the second contact 82 and the importance of the distance D1 being significantly larger than the distance D2 will be described with reference to FIG. 6 to FIG. 9.

Figure 6:
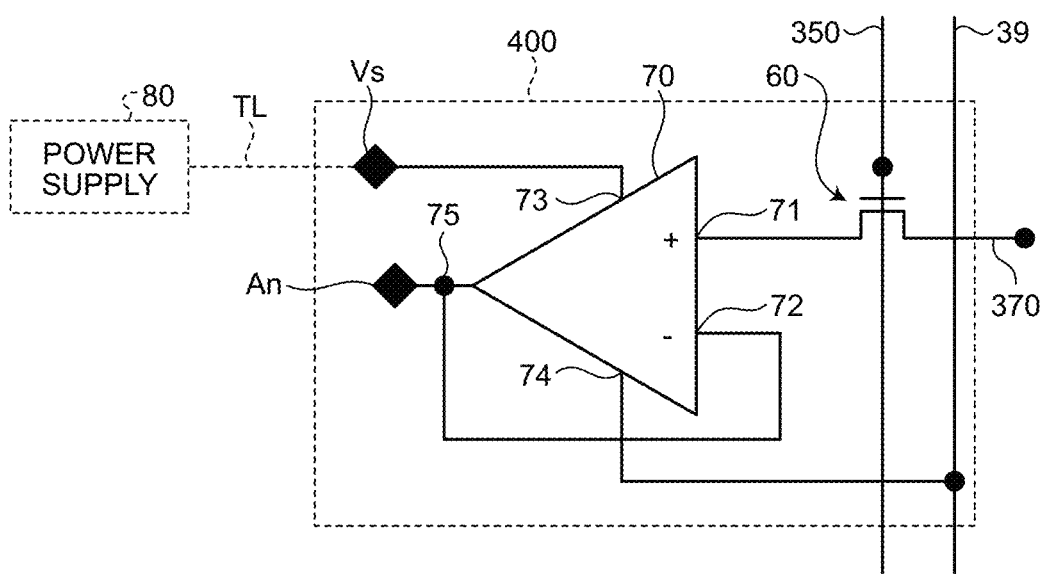
FIG. 6 is a schematic circuit diagram illustrating a configuration of a segment circuit as a reference example.

FIG. 6 is a schematic circuit diagram illustrating a configuration of a segment circuit 400 as a reference example. Unlike the segment circuit 40 described with reference to FIG. 4 and FIG. 5, the segment circuit 400 is configured such that the inverting input 72 (−) and the output 75 of the operational amplifier 70 are coupled to the anode electrode An via a third contact 83.

Figure 7:
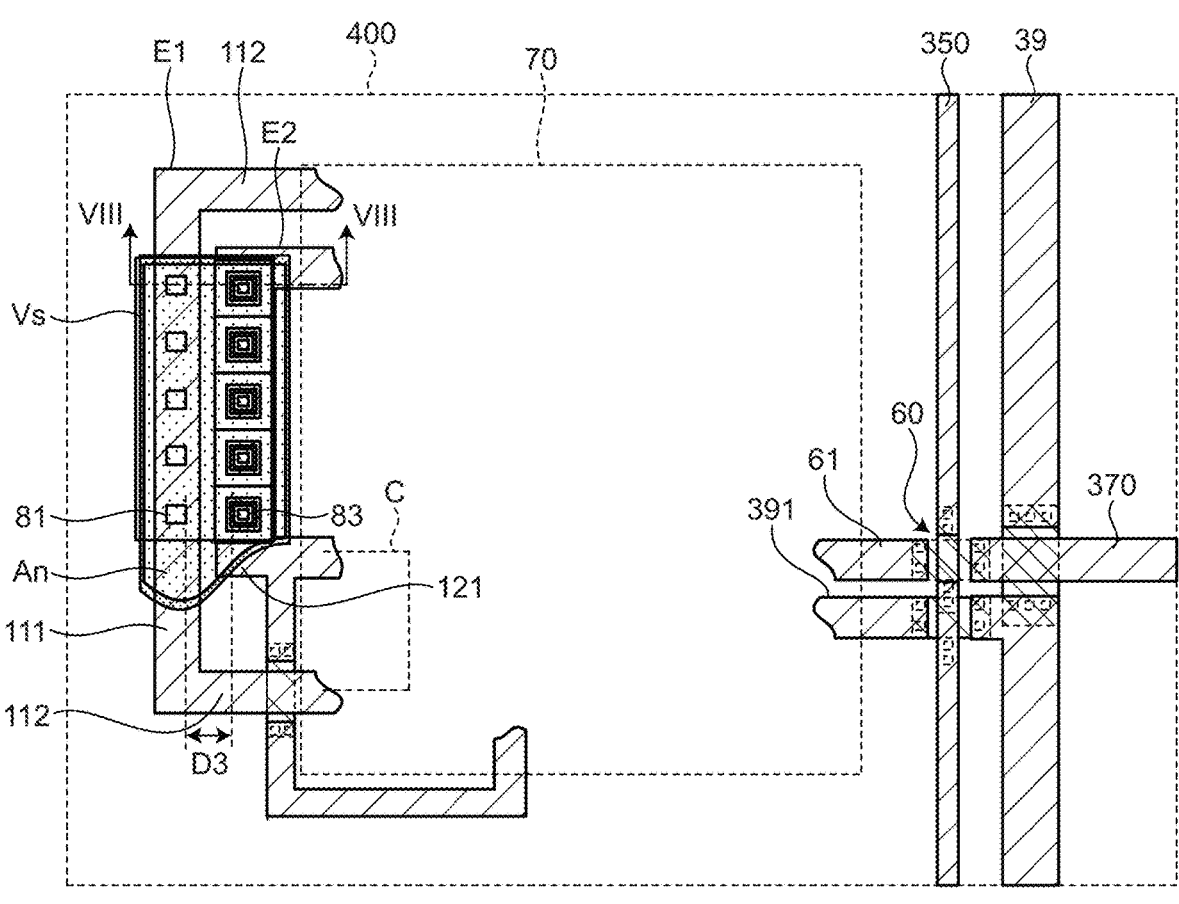
FIG. 7 is a Dx-Dy plan view illustrating an example of various types of wiring lines related to the configuration of the segment circuit illustrated in FIG. 6, the form of coupling between the light-transmissive electrode layer and the first wiring line via the first contact, and the form of coupling between the anode electrode and the second wiring line via a third contact.
Figure 7:
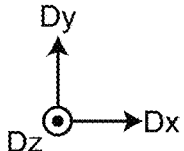

FIG. 7 is a Dx-Dy plan view illustrating an example of various types of wiring lines related to a configuration of the segment circuit 400 illustrated in FIG. 6, the form of coupling between the light-transmissive electrode layer Vs and the first wiring line E1 via the first contact 81, and the form of coupling between the anode electrode An and the second wiring line E2 via the third contact 83. As illustrated in FIG. 7, the third contact 83 is disposed in the first base 121 of the second wiring line E2. Hence, the first contact 81 and the third contact 83 in the segment circuit 400 are adjacent to each other on one side of the operational amplifier 70 in the second direction Dx. Thus, a distance D3 in the second direction Dx between the first contact 81 and the third contact 83 is shorter than a distance D1 between the first contact 81 and the second contact 82 in the segment circuit 40 (see FIG. 5).

Figure 8:
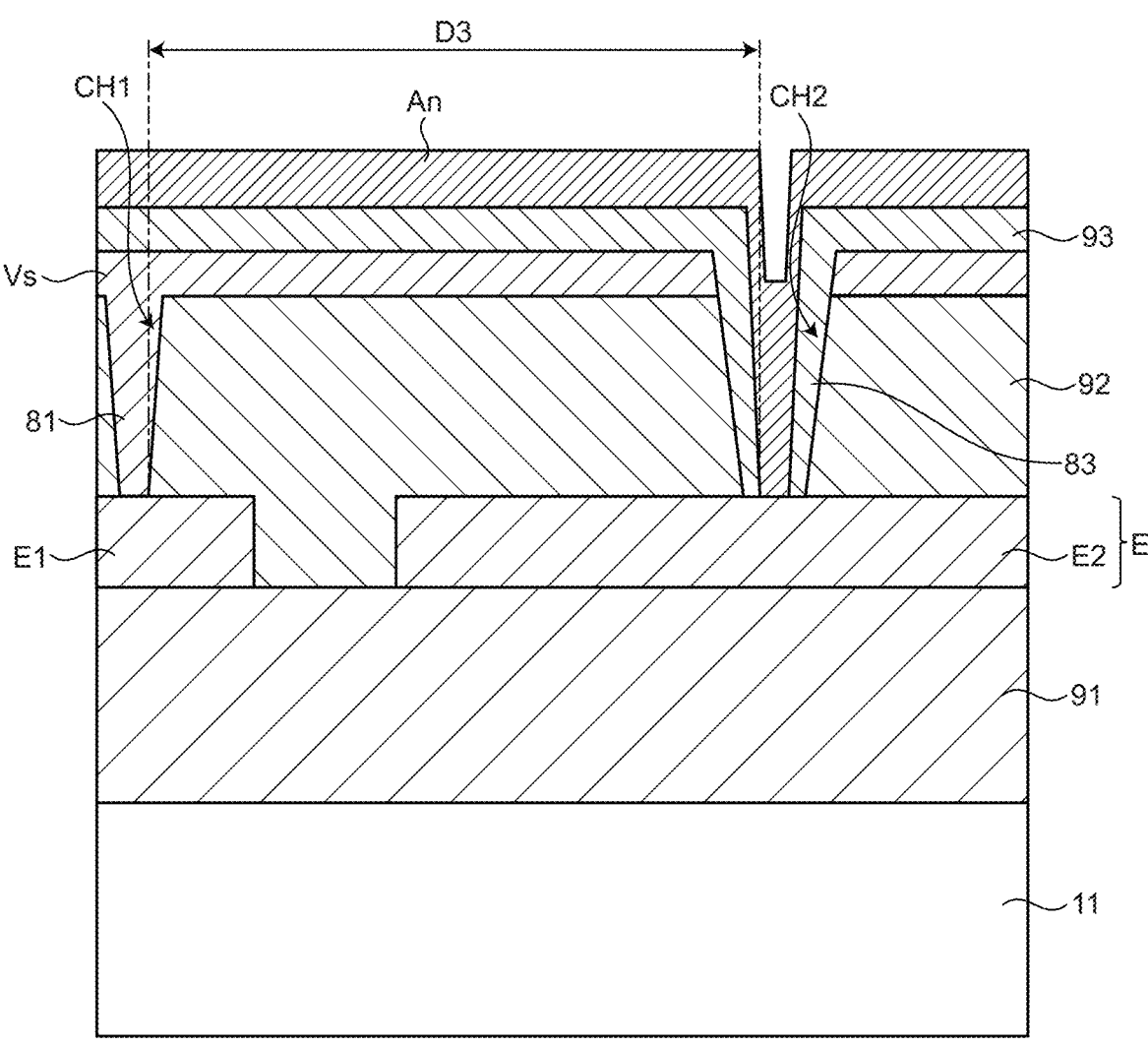
FIG. 8 is a cross-sectional view taken along a line VIII-VIII in FIG. 7.

FIG. 8 is a cross-sectional view taken along a line VIII-VIII in FIG. 7. As illustrated in FIG. 8, an insulating layer 91, a conductor layer E, an insulating layer 92, the light-transmissive electrode layer Vs, and an insulating layer 93 are stacked between the first substrate 11 and the anode electrode An from the first substrate 11 side toward the anode electrode An side. The first wiring line E1 and the second wiring line E2 are included in the conductor layer E. In other words, the first wiring line E1 and the second wiring line E2 are in the same layer. Note that wiring lines other than the first wiring line E1 and the second wiring line E2, such as the scanning lines 350, the transmission lines 370, and the wiring line 39, may be partially or entirely included in the conductor layer E or may be included in another conductor layer different from the conductor layer E, which is not illustrated.

Each of the insulating layer 91, the insulating layer 92, and the insulating layer 93 is an insulating layer having light-transmissive properties. A material to form the insulating layer can be, for example, silicon nitride (SiN), silicon oxide (SiO), or other materials similar thereto. The material is not limited thereto, and other materials that can be used for forming the insulating layer having light-transmissive properties may be employed. Each of the light-transmissive electrode layer Vs, the anode electrodes An, and the cathode electrode Ca is a conductor layer having light-transmissive properties. A material to form the conductor layer can be, for example, indium tin oxide (ITO), but is not limited thereto, and other materials that can be used for forming the conductor layer having light-transmissive properties may be employed. The conductor layer E is a conductor layer provided as a so-called metal electrode. A material to form the metal electrode can be, for example, copper or aluminum, but is not limited thereto, and other materials functioning likewise may be employed.

The conductor layer E is insulated from the light-transmissive electrode layer Vs by the insulating layer 92. Inside a contact hole CH1 provided in the insulating layer 92, the first contact 81 extends in the first direction Dz from the light-transmissive electrode layer Vs toward the first wiring line E1.

The light-transmissive electrode layer Vs is insulated from the anode electrodes An by the insulating layer 93. Inside a contact hole CH2 provided to penetrate the insulating layer 92, the light-transmissive electrode layer Vs, and the insulating layer 93, the third contact 83 extends in the first direction Dz from the anode electrodes An toward the second wiring line E2. Note that, in the first embodiment, the structure of a portion where the second contact 82 is disposed is the same as the structure of a portion where the third contact 83 illustrated in FIG. 8 is disposed.

Here, as illustrated in FIG. 8, when the distance between the first contact 81 and the third contact 83 is too small like the distance D3, a potential difference between the potential of the light-transmissive electrode layer Vs given to the first contact 81 and the potential of the third contact 83 given to the third contact 83 acts between the first contact 81 and the third contact 83 via the potential difference transmission line C illustrated in FIG. 7, whereby electrochemical corrosion sometimes occurs in the first contact 81 or the third contact 83. Such electrochemical corrosion can cause an anomaly in a circuit system coupled to the operational amplifier 70. Examples of such abnormality include a short circuit between the first wiring line E1 and the second wiring line E2 and failure in forming a line for conduction by the first contact 81 or the third contact 83. A major factor in the occurrence of such electrochemical corrosion is particularly a distance between a portion at which the first contact 81 is in contact with the first wiring line E1 and a portion at which the third contact 83 is in contact with the second wiring line E2, that is, the distance D3 illustrated in FIG. 7 and FIG. 8. When the distance D3 is less than 40 μm, the risk of such electrochemical corrosion greatly increases. As illustrated in FIG. 7, it is difficult to reduce the risk of such electrochemical corrosion when the first wiring line E1 provided with the first contact 81 and the second wiring line E2 provided with the third contact 83 are adjacent to each other on one side of the operational amplifier 70 in the second direction Dx.

Therefore, unlike the segment circuit 400 in the reference example described with reference to FIG. 7 and FIG. 8, the segment circuit 40 according to the first embodiment is configured such that the second contact 82 is disposed on the one side of the operational amplifier 70 in the third direction Dy and closer to the other side of the operational amplifier 70 in the second direction Dx. This configuration makes the distance D1 significantly larger than the distance D2, and thus the above-described risk of electrochemical corrosion is reduced. The distance D1 according to the first embodiment is significantly larger than 40 μm.

Figure 9:
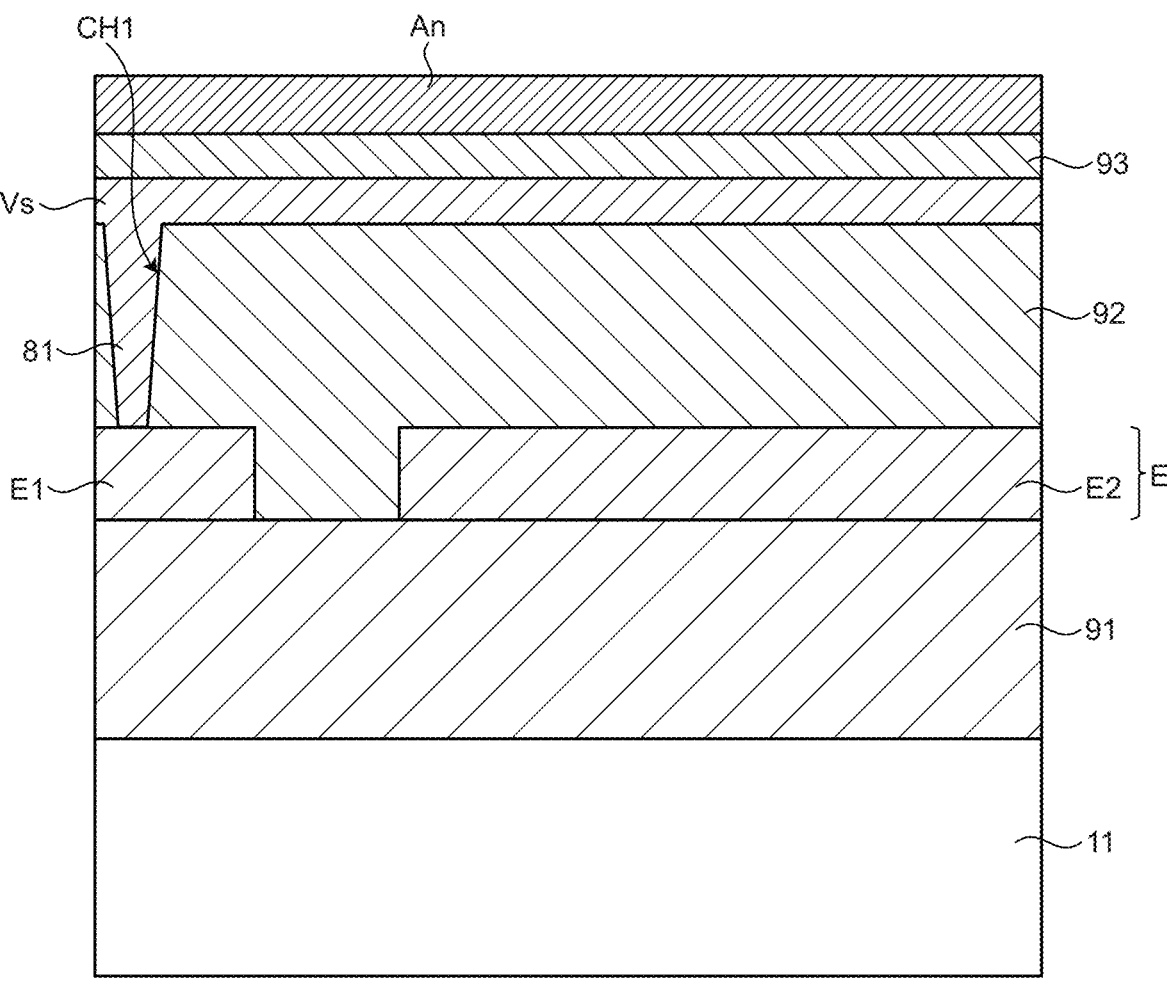
FIG. 9 is a cross-sectional view taken along a line IX-IX in FIG. 6.

FIG. 9 is a cross-sectional view taken along a line IX-IX in FIG. 6. In the first embodiment, no contact that is disposed adjacent to the first contact 81 on the one side of the operational amplifier 70 in the second direction Dx and has a different potential from that of the first contact 81 is provided. Hence, in the first embodiment, the electrochemical corrosion risk described with reference to the reference example can be reduced.

As described above, according to the first embodiment, the device 1 includes: two electrodes (an anode electrode An and a cathode electrode Ca) facing each other in the first direction Dz with the EC material interposed therebetween; an operational amplifier circuit (the operational amplifier 70) the output 75 of which is coupled to one of the two electrodes (the anode electrode An); the first wiring line E1 coupled to the positive power supply coupling part 73 of the operational amplifier circuit; the second wiring line E2 provided as a transmission line for the output 75; the first contact 81 coupling the first wiring line E1 to a light-transmissive conductor layer (the light-transmissive electrode layer Vs) that is stacked in the first direction Dz on the first conductor layer (the conductor layer E) with an insulating layer (the insulating layer 92) interposed therebetween and is configured to transmit a positive power supply potential (Vsupply) of the operational amplifier circuit, the first conductor layer forming the first wiring line E1; and the second contact 82 coupling the second wiring line E2 to the one electrode (the anode electrode An) that is stacked in the first direction Dz on a second conductor layer (the conductor layer E) with the insulating layers (the insulating layer 92, the insulating layer 93) therebetween, the second conductor layer forming the second wiring line E2. According to the first embodiment, the distance D1 in the second direction Dx between the first contact 81 and the second contact 82 is larger than the distance D2 between a part of the first wiring line E1 (the base 111) and a part of the second wiring line E2 (the first base 121), which are aligned in parallel along the second direction Dx, whereby electrochemical corrosion between the first contact 81 and the second contact 82 can be reduced.

In addition, one of the first contact 81 and the second contact 82 (the first contact 81) is positioned on one side of the operational amplifier circuit (the operational amplifier 70) in the second direction Dx, meanwhile the other one of the first contact 81 and the second contact 82 (the second contact 82) is not positioned on the one side of the operational amplifier circuit in the second direction Dx, whereby the first contact 81 and the second contact 82 can be more surely physically disposed far from each other. Thus, electrochemical corrosion between the first contact 81 and the second contact 82 can be more surely reduced.

In addition, the distance between the first contact 81 and the second contact 82 in the second direction Dx is 40 μm or more, whereby the first contact 81 and the second contact 82 can be more surely physically disposed far from each other. Thus, electrochemical corrosion between the first contact 81 and the second contact 82 can be more surely reduced.

Second Embodiment

Next, a second embodiment, which is partially different from the first embodiment, will be described with reference to FIG. 10 and FIG. 11. In descriptions of the second embodiment, what are different from those in the first embodiment will be specially described, meanwhile what are similar to those in the first embodiment will be given the same reference numerals and descriptions thereof will be sometimes omitted. In the second embodiment, a segment circuit 40A is employed in place of the segment circuit 40 according to the first embodiment.

Figure 10:
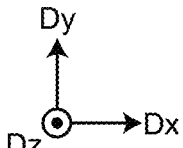
FIG. 10 is a Dx-Dy plan view illustrating an example of various types of wiring lines related to a configuration of a segment circuit A, the form of coupling between the light-transmissive electrode layer and the first wiring line via the first contact, and the form of coupling between the anode electrode and a second wiring line E2 via the second contact.

FIG. 10 is a Dx-Dy plan view illustrating an example of various types of wiring lines related to a configuration of the segment circuit 40A, the form of coupling between the light-transmissive electrode layer Vs and the first wiring line E1 via the first contact 81, and the form of coupling between the anode electrode An and the second wiring line E2 via the second contact 82. As illustrated in FIG. 10, the segment circuit 40A includes a conductor layer M1 in addition to the configuration of the segment circuit 40 according to the first embodiment.

The conductor layer M1 is a conductor layer having a lower electrical resistance than that of the light-transmissive electrode layer Vs. Specifically, as a material to form the conductor layer M1, a material similar to a material of a so-called metal electrode, for example, copper or aluminum, can be employed. However, the material to form the conductor layer M1 is not limited thereto, and other materials functioning likewise may be employed.

As described above, the light-transmissive electrode layer Vs is a conductor layer having light-transmissive properties, such as ITO. Such conductor layer having light-transmissive properties has a relatively higher electrical resistance, compared to a so-called metal electrode. Such a relatively higher electrical resistance sometimes causes a voltage drop (so-called IR drop) due to electrical resistance, depending on a positional relation between a power supply point to give a positive power supply potential (Vsupply) to the light-transmissive electrode layer Vs and the first contact 81. In other words, when a transmission line between the power supply point and the first contact 81 is composed of only the light-transmissive electrode layer Vs, there arises a possibility that the influence of the relatively higher electrical resistance cannot be ignored. Therefore, in the second embodiment, a transmission line between the power supply point and the first contact 81 is formed by the conductor layer M1, whereby there can be formed the transmission line having a lower electrical resistance than that of the transmission line composed of only the conductor layer having light-transmissive properties. Thus, the voltage drop can be substantially prevented. In other words, it can be said that, in the second embodiment, a part of the transmission line TL illustrated in FIG. 4 is composed of the conductor layer M1 and extends into the active area AA.

Figure 11:
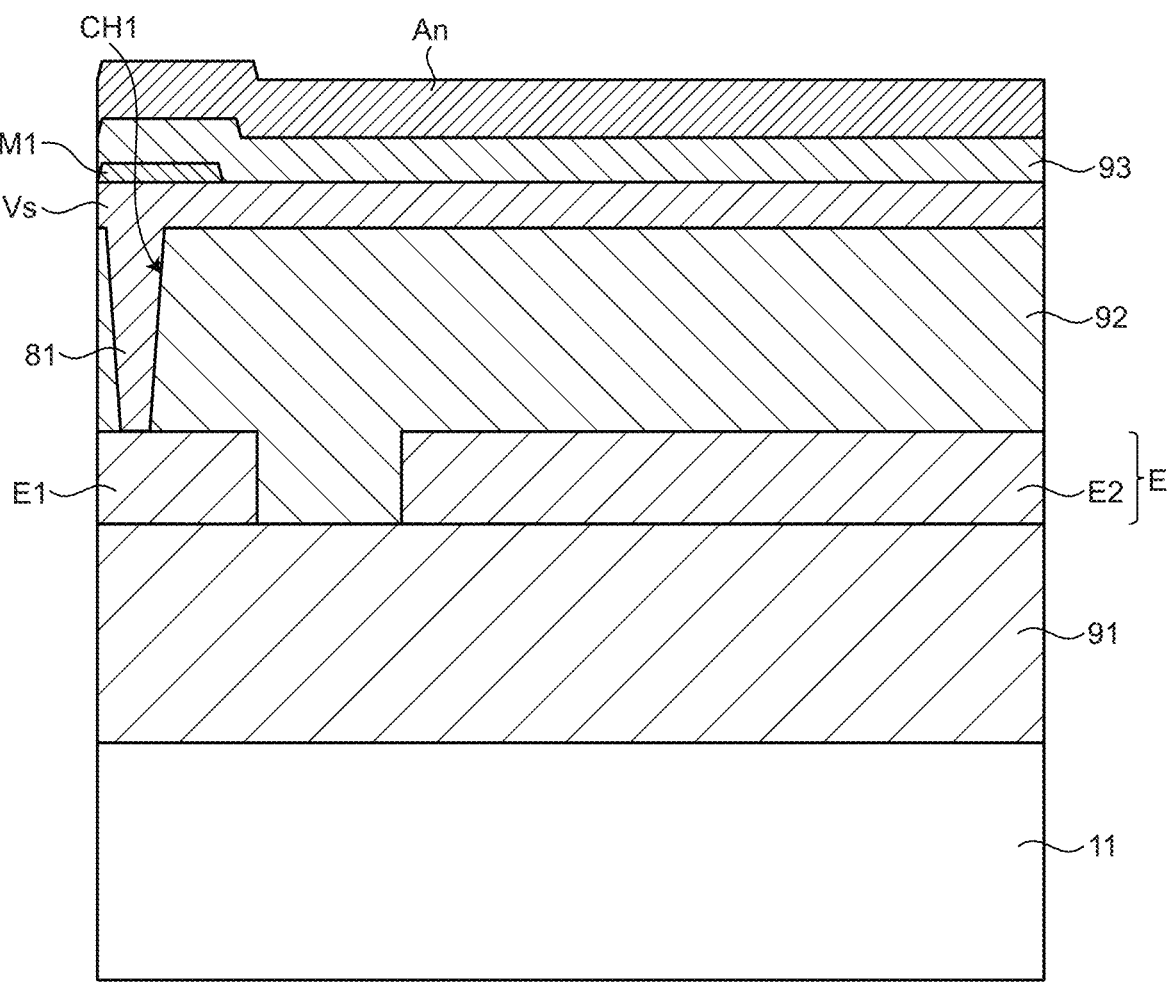
FIG. 11 is a cross-sectional view taken along a line XI-XI in FIG. 10.

FIG. 11 is a cross-sectional view taken along a line XI-XI in FIG. 10. As illustrated in FIG. 11, the conductor layer M1 is stacked between the light-transmissive electrode layer Vs and the insulating layer 93 and is in contact with the light-transmissive electrode layer Vs. As illustrated in FIG. 10, a portion of the conductor layer M1 along the third direction Dy overlaps the wiring line 39 or a portion of the first wiring line E1 along the third direction Dy in plan view. Thus, an influence on the light-transmissive properties of the active area AA that would be caused by the provision of the conductor layer M1 can be further reduced. Note that, in the example illustrated in FIG. 10, the operational amplifier 70 overlaps, in plan view, a middle portion in the conductor layer M1 that is provided along the second direction Dx and couples a portion in the conductor layer M1 overlapping the first wiring line E1 and a portion in the conductor layer M1 overlapping the wiring line 39. This is merely an example of the form of the conductor layer M1, and the form of the conductor layer M1 is not limited thereto and can be modified as needed.

Except for those noted above, the second embodiment is the same as the first embodiment. According to the second embodiment, a third conductor layer (the conductor layer M1) stacked on a light-transmissive conductor layer (the light-transmissive electrode layer Vs) in the first direction Dz and having a lower electrical resistance than that of the light-transmissive conductor layer transmits the positive power supply potential (Vsupply), whereby the positive power supply potential (Vsupply) can be more surely transmitted to the operational amplifier circuit (the operational amplifier 70).

Furthermore, the part of a wiring line formed by the third conductor layer (the conductor layer M1) overlaps the part of the first wiring line E1 in the Dx-Dy plan view, whereby a decrease in light-transmissive properties due to the third conductor layer can be substantially prevented.

In the multilayered structures illustrated in FIG. 9 and FIG. 11, the conductor layer constituting the first wiring line E1 and the conductor layer constituting the second wiring line E2 are composed with the same conductor layer (the conductor layer E), but the first wiring line E1 and the second wiring line E2 may be composed with different layers.

The relationships between the second direction Dx and the third direction Dy illustrated in FIG. 5 and FIG. 10 may be reversed. For example, the base 111 and the first base 121 may be parallel to the scanning lines 350 and the wiring line 39, and the extension 112 and the second base 122 may be parallel to the transmission lines 370. In this case, the circuit configuration is such that, in the configuration surrounding the operational amplifier 70, a configuration on the left side of the wiring line 61 and the branch line 391 in FIG. 5 and FIG. 10 is rotated 90 degrees to the right. In this case, the second contact 82 is positioned on one side of the operational amplifier 70 in the second direction Dx, meanwhile the first contact 81 is not positioned on the one side of the operational amplifier 70 in the second direction Dx.

In FIG. 3, the anode electrode An is provided for each of the segment circuits 40. In other words, in the first embodiment described above, the segment circuits 40 are arranged in a matrix of a row-column configuration in FIG. 2, and the anode electrodes An are individually provided such that the anode electrodes An correspond to the segment circuits 40 on a one-to-one basis. Such aspect of the anode electrode An is not necessarily essential. For example, the anode electrode An may be provided having the same configuration as electrode layers being continuous in the active area AA, like the cathode electrode Ca. The entirety of one anode electrode An faces the entirety of one cathode electrode Ca. Even in this case, the segment circuits 40 are coupled to the anode electrode An at different positions. In other words, one anode electrode An is coupled to the segment circuits 40. A state in which potentials are not uniform in the active area AA may possibly occur in the anode electrode An, and therefore a technical significance of controlling the voltage that is applied to the EC material 15 via each of the segment circuits 40 is established.

It is understood that other effects achieved by the aspects described in the embodiments, the other effects being apparent from the descriptions in the present specification or being conceivable by those skilled in the art, are naturally achieved by the present disclosure.

What is claimed is:

1. An electrochromic device, comprising:
two electrodes facing each other in a first direction with an electrochromic material interposed therebetween;
an operational amplifier circuit an output of which is coupled to one of the two electrodes;
a first wiring line coupled to a positive power supply coupling part of the operational amplifier circuit;
a second wiring line provided as a transmission line for the output;
a first contact coupling the first wiring line to a light-transmissive conductor layer that is stacked in the first direction on a first conductor layer with an insulating layer interposed therebetween and is configured to transmit a positive power supply potential of the operational amplifier circuit, the first conductor layer forming the first wiring line; and
a second contact coupling the second wiring line to the one electrode that is stacked in the first direction on a second conductor layer with an insulating layer interposed therebetween, the second conductor layer forming the second wiring line, wherein
a distance between the first contact and the second contact in a second direction is larger than a distance between a part of the first wiring line and a part of the second wiring line that are aligned in parallel in the second direction.

2. The electrochromic device according to claim 1, wherein
one of the first contact and the second contact is positioned on one side of the operational amplifier circuit in the second direction, and
the other one of the first contact and the second contact is not positioned on the one side of the operational amplifier circuit in the second direction.

3. The electrochromic device according to claim 2, wherein the distance in the second direction between the first contact and the second contact is 40 μm or more.

4. The electrochromic device according to claim 1, further comprising a third conductor layer that is stacked on the light-transmissive conductor layer in the first direction, has an electrical resistance lower than an electrical resistance of the light-transmissive conductor layer, and is configured to transmit the positive power supply potential.

5. The electrochromic device according to claim 4, wherein a part of a wiring line formed by the third conductor layer overlaps a part of the first wiring line in a plan view orthogonal to the first direction.

\* \* \* \* \*